US012812622B2

(12) United States Patent
Yuan et al.

(10) Patent No.: US 12,812,622 B2
(45) Date of Patent: Nov. 24, 2026

(54) POWER CONTROL PARAMETER INDICATION IN CONNECTION WITH A TRANSMISSION CONFIGURATION INDICATOR STATE

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 301 days.

(21) Appl. No.: 18/694,695

(22) PCT Filed: Nov. 4, 2021

(86) PCT No.: PCT/CN2021/128593
§ 371 (c)(1),
(2) Date: Mar. 22, 2024

(87) PCT Pub. No.: WO2023/077345
PCT Pub. Date: May 11, 2023

(65) Prior Publication Data
US 2024/0406945 A1 Dec. 5, 2024

(51) Int. Cl.
*H04L 5/00* (2006.01)
*H04W 72/044* (2023.01)

(52) U.S. Cl.
CPC ....... *H04W 72/0473* (2013.01); *H04L 5/0096* (2013.01)

(58) Field of Classification Search
CPC .............. H04L 5/0096; H04W 52/146; H04W 72/0473
(Continued)

(56) References Cited

U.S. PATENT DOCUMENTS 11,316,577 B2 4/2022 John Wilson et al.
2020/0112941 A1 4/2020 Yerramalli et al.
(Continued)

FOREIGN PATENT DOCUMENTS

CN 113179551 A 7/2021
WO 2019217717 A1 11/2019
(Continued)

OTHER PUBLICATIONS

Interdigital Inc: "On NR Power Control Framework", 3GPP TSG RAN WG1 Meeting 90bis, R1-1718502, Prague, Czech Republic, Oct. 9-13, 2017, 4 Pages.
(Continued)

*Primary Examiner* — Robert J Lopata
(74) *Attorney, Agent, or Firm* — Harrity & Harrity, LLP \ Qualcomm

(57) ABSTRACT

Various aspects of the present disclosure generally relate to wireless communication. In some aspects, a user equipment (UE) may receive information indicating a set of power control parameters associated with a transmission configuration indicator (TCI) state for an uplink channel, wherein the uplink channel is associated with a particular service. The UE may transmit, on the uplink channel, a communication associated with the particular service in accordance with the set of power control parameters, wherein one or more other communications associated with one or more other services on the uplink channel are associated with one or more other power control parameters. Numerous other aspects are described.

20 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2023/0379835 | A1* | 11/2023 | Matsumura | H04W 52/54 |
| 2024/0129858 | A1* | 4/2024 | Matsumura | H04W 52/146 |
| 2024/0224192 | A1* | 7/2024 | Yuan | H04W 52/54 |
| 2024/0259950 | A1* | 8/2024 | Nilsson | H04W 52/42 |
| 2024/0333369 | A1* | 10/2024 | Yuan | H04L 5/0023 |
| 2025/0031151 | A1* | 1/2025 | Deghel | H04W 72/23 |
| 2025/0106781 | A1* | 3/2025 | Bai | H04W 52/248 |

FOREIGN PATENT DOCUMENTS

| | | |
|---|---|---|
| WO | 2020072754 | 4/2020 |
| WO | 2021202037 | 10/2021 |

OTHER PUBLICATIONS

International Search Report and Written Opinion—PCT/CN2021/128593—ISA/EPO—Jul. 26, 2022.

Moderator (Samsung): “Moderator Summary#5 for Multi-Beam Enhancement”, 3GPP Draft, 3GPP TSG RAN WG1 #103-e, R1-2009749, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 13, 2020 (Nov. 13, 2020), XP051954406, 12 pages, pp. 2-7.

Nokia., et al., “Remaining Details on NR Pusch Power Control”, 3GPP Draft, R1-1805156, 3GPP TSG RAN WG1 Meeting #92bis, 3rd Generation Partnership Project (3GPP), Mobile Competence Centre, 650, Route Des Lucioles, F-06921 Sophia-Antipolis Cedex, France, vol. RAN WG1, No. Sanya, China, Apr. 16, 2018-Apr. 20, 2018, Apr. 15, 2018 (Apr. 15, 2018), XP051427412, 4 Pages, Paragraph [02.1]-Paragraph [02.2].

* cited by examiner

POWER CONTROL PARAMETER INDICATION IN CONNECTION WITH A TRANSMISSION CONFIGURATION INDICATOR STATE

CROSS-REFERENCE TO RELATED APPLICATION

This Patent Application is a 371 National Phase of PCT/CN2021/128593, filed on Nov. 4, 2021, entitled "POWER CONTROL PARAMETER INDICATION IN CONNECTION WITH A TRANSMISSION CONFIGURATION INDICATOR STATE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for power control parameter indication in connection with a transmission configuration indicator (TCI) state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a UE. The method may include receiving information indicating a set of power control parameters associated with a TCI state for an uplink channel, wherein the uplink channel is associated with a particular service. The method may include transmitting, on the uplink channel, a communication associated with the particular service in accordance with the set of power control parameters, wherein one or more other communications associated with one or more other services on the uplink channel are associated with one or more other power control parameters.

Some aspects described herein relate to a method of wireless communication performed by a base station. The method may include transmitting information indicating a set of power control parameters associated with a TCI state for an uplink channel, wherein the uplink channel is associated with a particular service. The method may include receiving, on the uplink channel, a communication associated with the particular service in accordance with the set of power control parameters, wherein one or more other communications associated with one or more other services on the uplink channel are associated with one or more other power control parameters.

Some aspects described herein relate to a UE for wireless communication. The user equipment may include a memory and one or more processors coupled to the memory. The one or more processors may be configured to receive information indicating a set of power control parameters associated with a TCI state for an uplink channel, wherein the uplink channel is associated with a particular service. The one or more processors may be configured to transmit, on the uplink channel, a communication associated with the particular service in accordance with the set of power control parameters, wherein one or more other communications associated with one or more other services on the uplink channel are associated with one or more other power control parameters.

Some aspects described herein relate to a base station for wireless communication. The base station may include a memory and one or more processors coupled to the memory. The one or more processors may be configured to transmit information indicating a set of power control parameters associated with a TCI state for an uplink channel, wherein the uplink channel is associated with a particular service. The one or more processors may be configured to receive, on the uplink channel, a communication associated with the particular service in accordance with the set of power control parameters, wherein one or more other communications associated with one or more other services on the uplink channel are associated with one or more other power control parameters.

Some aspects described herein relate to a non-transitory computer-readable medium that stores a set of instructions for wireless communication by a UE. The set of instructions, when executed by one or more processors of the UE, may cause the UE to receive information indicating a set of power control parameters associated with a TCI state for an uplink channel, wherein the uplink channel is associated with a particular service. The set of instructions, when executed by one or more processors of the UE, may cause the UE to transmit, on the uplink channel, a communication associated with the particular service in accordance with the set of power control parameters, wherein one or more other communications associated with one or more other services on the uplink channel are associated with one or more other power control parameters.

Some aspects described herein relate to a non-transitory computer-readable medium that stores a set of instructions for wireless communication by a base station. The set of instructions, when executed by one or more processors of the base station, may cause the base station to transmit information indicating a set of power control parameters associated with a TCI state for an uplink channel, wherein the uplink channel is associated with a particular service. The set of instructions, when executed by one or more processors of the base station, may cause the base station to receive, on the uplink channel, a communication associated with the particular service in accordance with the set of power control parameters, wherein one or more other communications associated with one or more other services on the uplink channel are associated with one or more other power control parameters.

Some aspects described herein relate to an apparatus for wireless communication. The apparatus may include means for receiving information indicating a set of power control parameters associated with a TCI state for an uplink channel, wherein the uplink channel is associated with a particular service. The apparatus may include means for transmitting, on the uplink channel, a communication associated with the particular service in accordance with the set of power control parameters, wherein one or more other communications associated with one or more other services on the uplink channel are associated with one or more other power control parameters.

Some aspects described herein relate to an apparatus for wireless communication. The apparatus may include means for transmitting information indicating a set of power control parameters associated with a TCI state for an uplink channel, wherein the uplink channel is associated with a particular service. The apparatus may include means for receiving, on the uplink channel, a communication associated with the particular service in accordance with the set of power control parameters, wherein one or more other communications associated with one or more other services on the uplink channel are associated with one or more other power control parameters.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
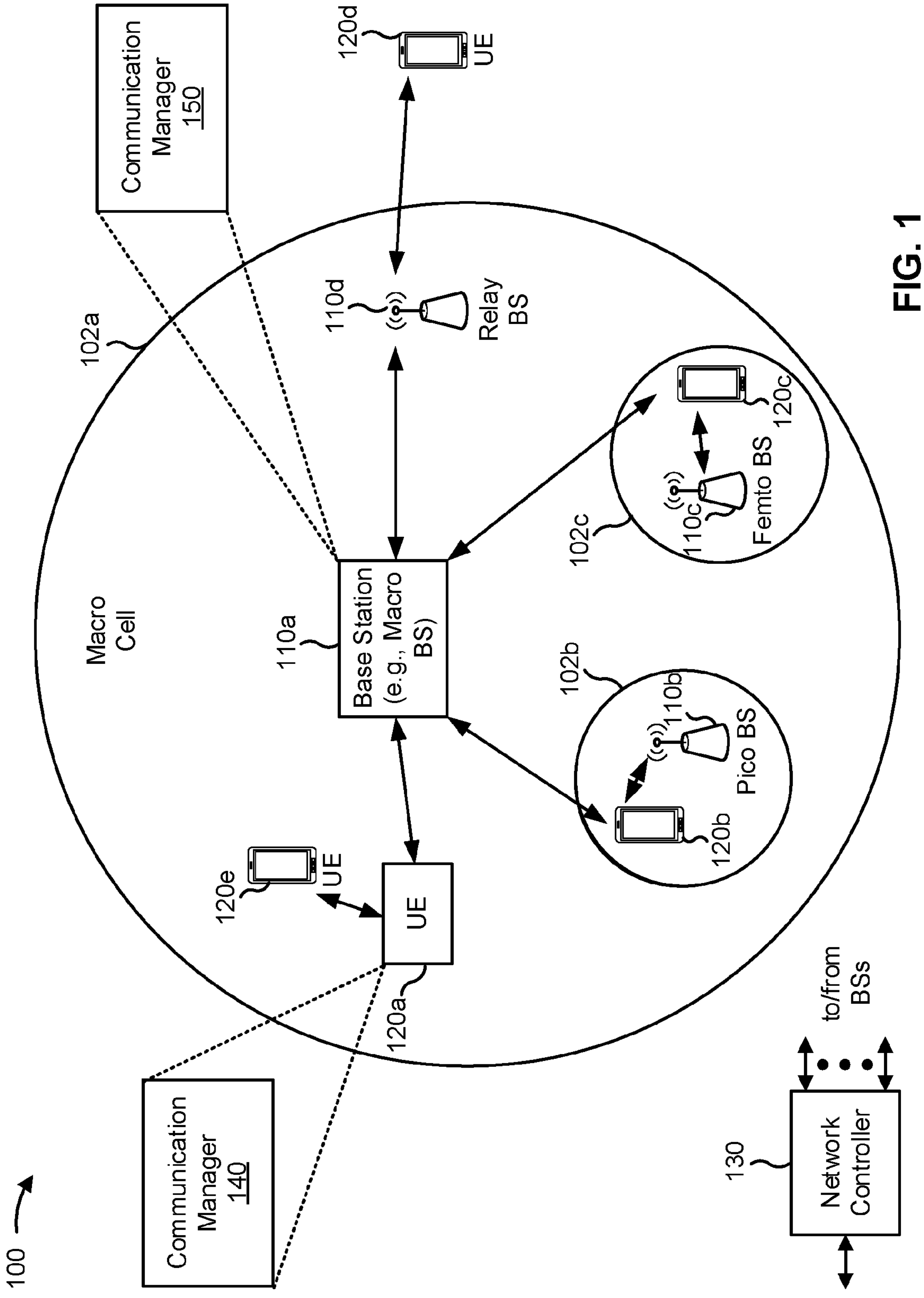
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrow band IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive information indicating a set of power control parameters associated with a transmission configuration indicator (TCI) state for an uplink channel, wherein the uplink channel is associated with a particular service: and transmit, on the uplink channel, a communication associated with the particular service in accordance with the set of power control parameters, wherein one or more other communications associated with one or more other services on the uplink channel are associated with one or more other power control parameters. Additionally, or alternatively, the communication manager 140 may perform one or more other operations described herein.

In some aspects, the base station 110 may include a communication manager 150. As described in more detail elsewhere herein, the communication manager 150 may transmit information indicating a set of power control parameters associated with a TCI state for an uplink channel, wherein the uplink channel is associated with a particular service: and receive, on the uplink channel, a communication associated with the particular service in accordance with the set of power control parameters, wherein one or more other communications associated with one or more other services on the uplink channel are associated with one or more other power control parameters. Additionally, or alternatively, the communication manager 150 may perform one or more other operations described herein.

As indicated above, FIG. 1 is provided as an example. Other examples may differ from what is described with regard to FIG. 1.

Figure 2:
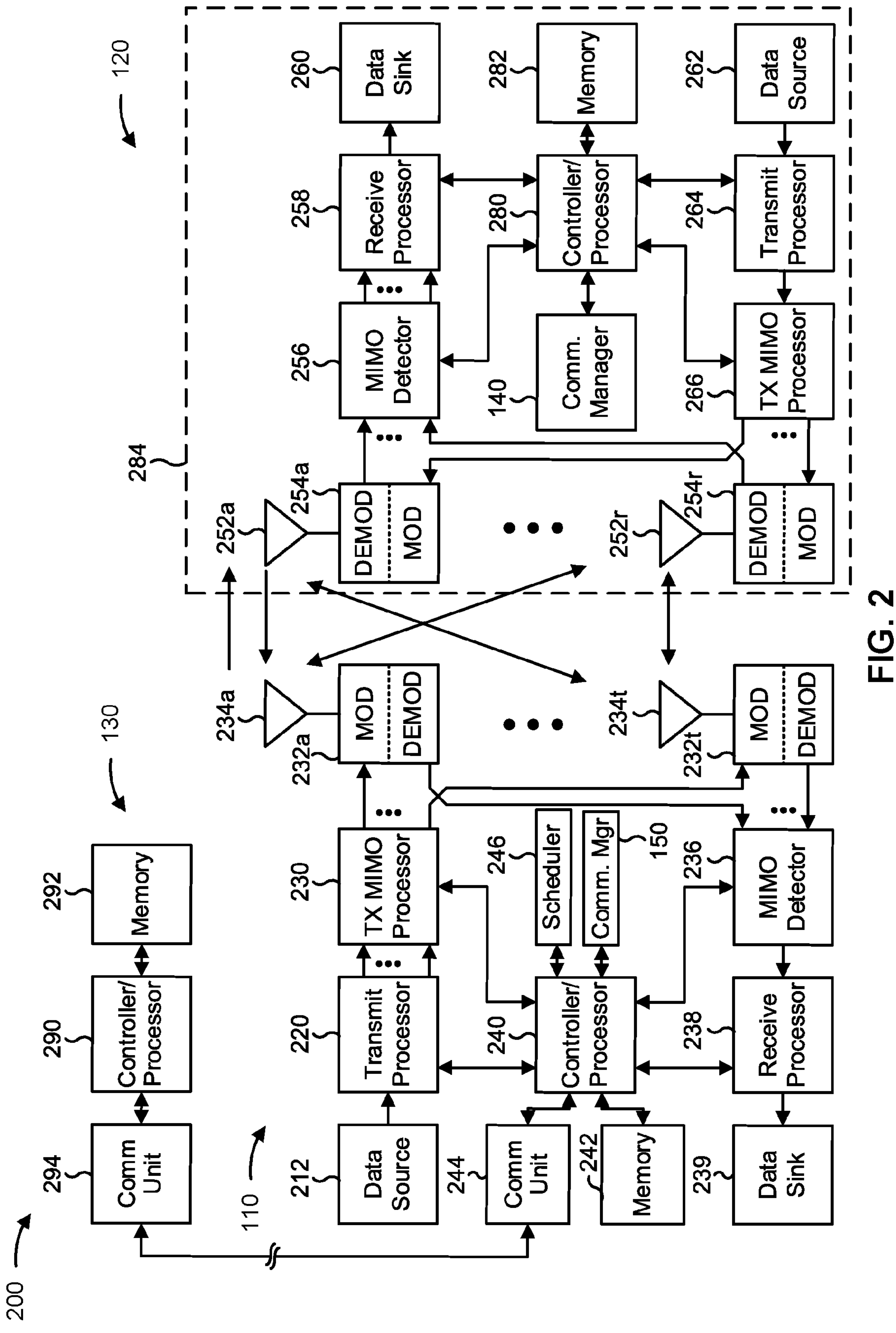
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the base station 110, the controller/processor 280 of the UE 120, and/or any other component(s) of FIG. 2 may perform one or more techniques associated with power control parameter indication in connection with a TCI state, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving information indicating a set of power control parameters associated with a TCI state for an uplink channel, wherein the uplink channel is associated with a particular service: and/or means for transmitting, on the uplink channel, a communication associated with the particular service in accordance with the set of power control parameters, wherein one or more other communications associated with one or more other services on the uplink channel are associated with one or more other power control parameters. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting information indicating a set of power control parameters associated with a TCI state for an uplink channel, wherein the uplink channel is associated with a particular service; and/or means for receiving, on the uplink channel, a communication associated with the particular service in accordance with the set of power control parameters, wherein one or more other communications associated with one or more other services on the uplink channel are associated with one or more other power control parameters. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
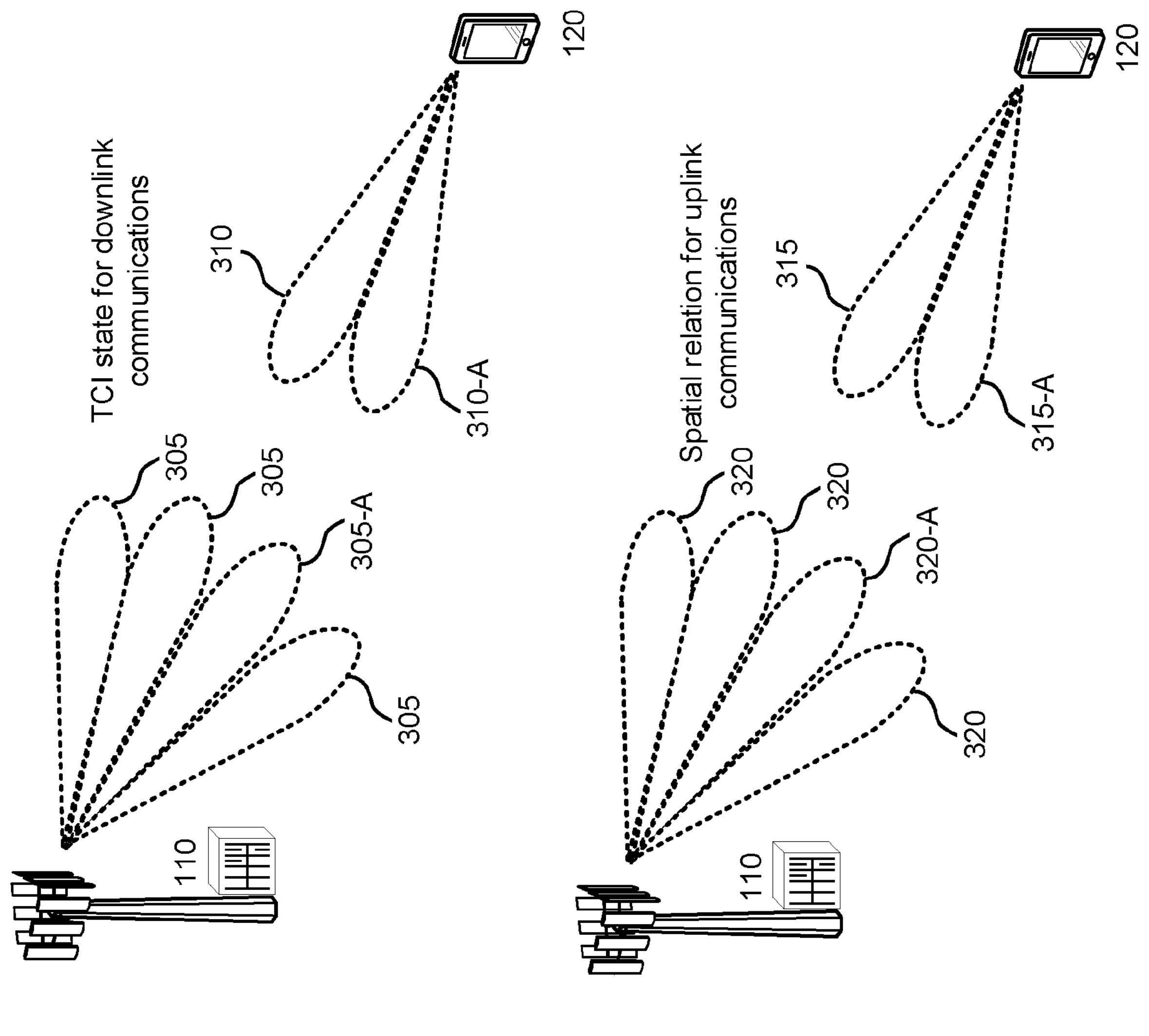
FIG. 3 is a diagram illustrating an example of using beams for communications between a base station and a UE, in accordance with the present disclosure.

FIG. 3 is a diagram illustrating an example 300 of using beams for communications between a base station and a UE, in accordance with the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a TCI state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each BS transmit beam 305 may be associated with a synchronization signal block (SSB), and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state.

A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

Under a unified TCI framework, different types of common TCI states may be indicated. For example, a type-1 TCI may be a joint downlink (DL)/uplink (UL) (DL/UL) common TCI state to indicate a common beam for at least one DL channel or reference signal (RS) and at least one UL channel or RS. A type-2 TCI may be a separate DL (e.g., separate from UL) common TCI state to indicate a common beam for more than one DL channel or RS. A type-3 TCI may be a separate UL common TCI state to indicate a common beam for more than one UL channel or RS. A type-4 TCI may be a separate DL single channel or RS TCI state to indicate a beam for a single DL channel or RS. A type-5 TCI may be a separate UL single channel or RS TCI state to indicate a beam for a single UL channel or RS. A type-6 TCI may include UL spatial relation information (e.g., such as a sounding reference signal (SRS) resource indicator (SRI)) to indicate a beam for a single UL channel or RS. Example RSs that may be configured using a TCI state, such as under the unified TCI framework, may include an SSB, a tracking reference signal (TRS) and an associated CSI-RS for tracking, a CSI-RS for beam management, a CSI-RS for CQI management, or a demodulation reference signal (DM-RS) associated with non-UE-dedicated reception on a PDSCH and a set or subset of control resource sets (CORESETs), among other examples.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 315. The UE 120 may receive, such as when a unified TCI framework with joint TCI states is configured, an indication of a TCI state for a physical uplink shared channel (PUSCH), a physical uplink control channel (PUCCH), or a sounding reference signal (SRS), among other examples. The TCI state may have associated power control parameters, such as an associated P0 value, alpha value, closed loop index, or delta value, among other examples. The UE 120 may apply the power control parameters for each uplink transmission on a bandwidth part (BWP) associated with the TCI state. The UE 120 may receive information indicating an association between the TCI state and the power control parameters via radio resource control (RRC) signaling. In some cases, the UE 120 may receive information updating the association between the TCI state and the power control parameters (e.g., changing a power control parameter) via a medium access control (MAC) control element (CE) (MAC-CE).

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

As indicated above, FIG. 3 is provided as an example. Other examples may differ from what is described with respect to FIG. 3.

Figure 4:
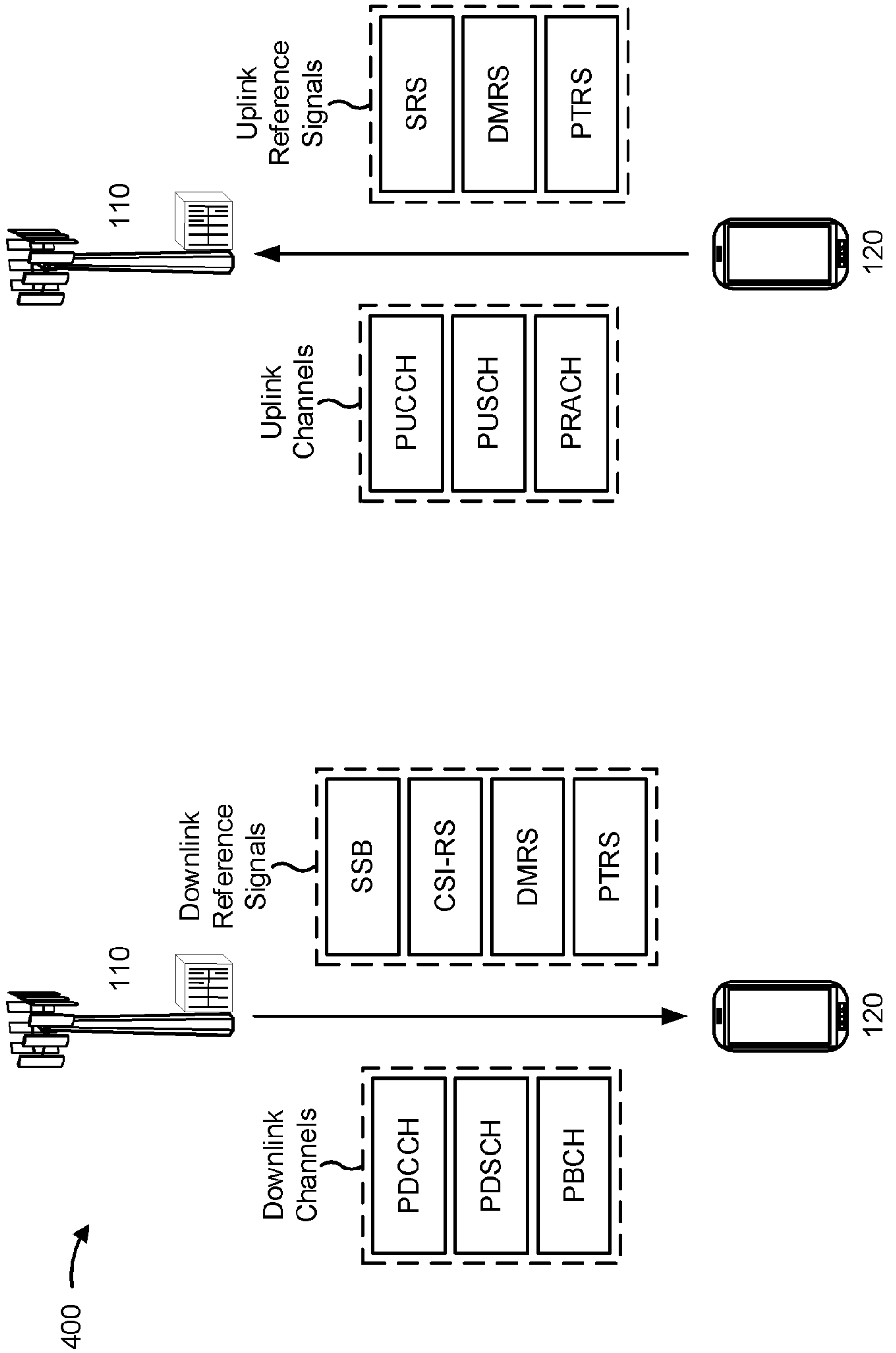
FIG. 4 is a diagram illustrating an example of physical channels and reference signals in a wireless network, in accordance with the present disclosure.

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a PDCCH that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a PUCCH that carries uplink control information (UCI), a PUSCH that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a SSB, CSI-RS, a demodulation reference signal (DMRS), a positioning reference signal (PRS), or a phase tracking reference signal (PTRS), among other examples. As also shown, an uplink reference signal may include an SRS, a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs.

Based at least in part on the measurements, the UE 120 may perform channel estimation and may report channel estimation parameters to the base station 110 (e.g., in a CSI report), such as a channel quality indicator (CQI), a precoding matrix indicator (PMI), a CSI-RS resource indicator (CRI), a layer indicator (LI), a rank indicator (RI), or a reference signal received power (RSRP), among other examples. The base station 110 may use the CSI report to select transmission parameters for downlink communications to the UE 120, such as a number of transmission layers (e.g., a rank), a precoding matrix (e.g., a precoder), a modulation and coding scheme (MCS), or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

As described above, a UE may receive an indication of a TCI state that is applicable to a plurality of uplink channels, such as a PUSCH, a PUCCH, or an SRS, among other examples, that are to be transmitted on a bandwidth part associated with the TCI state. The UE may be configured with a set of power control parameters associated with the TCI state and may use the set of power control parameters for determining a transmit power for the plurality of uplink channels. However, different services on the plurality of uplink channels may have different transmit powers to achieve different metrics (e.g., reliability metrics or latency metrics). For example, an enhanced mobile broadband (eMBB) service may use a first transmit power to achieve a specified metric for eMBB and an ultra-reliable low-latency communication (URLLC) service may use a second transmit power to achieve a specified metric for URLLC. Accordingly, using a single set of power control parameters associated with a TCI state may result in excessive or insufficient transmit power for some services.

Some aspects described herein enable service-based power control. A UE may receive, for a TCI state, a plurality of sets of power control parameters associated with a plurality of services and may receive information indicating a particular set of power control parameters, of the plurality of sets of power control parameters, to use for a particular transmission. For example, the UE may receive an indication to transmit, using a TCI state, a communication associated with a URLLC service and may select a power control parameter set associated with URLLC service from the plurality of sets of power control parameters for the TCI state. In this case, the UE may transmit with a transmit power corresponding to metrics that are to be achieved for the URLLC service. In this way, the UE enables differentiated transmit power control for different services transmitted using a common TCI state, thereby achieving latency metrics, reliability metrics, and/or improving network performance, among other examples.

Figure 5:
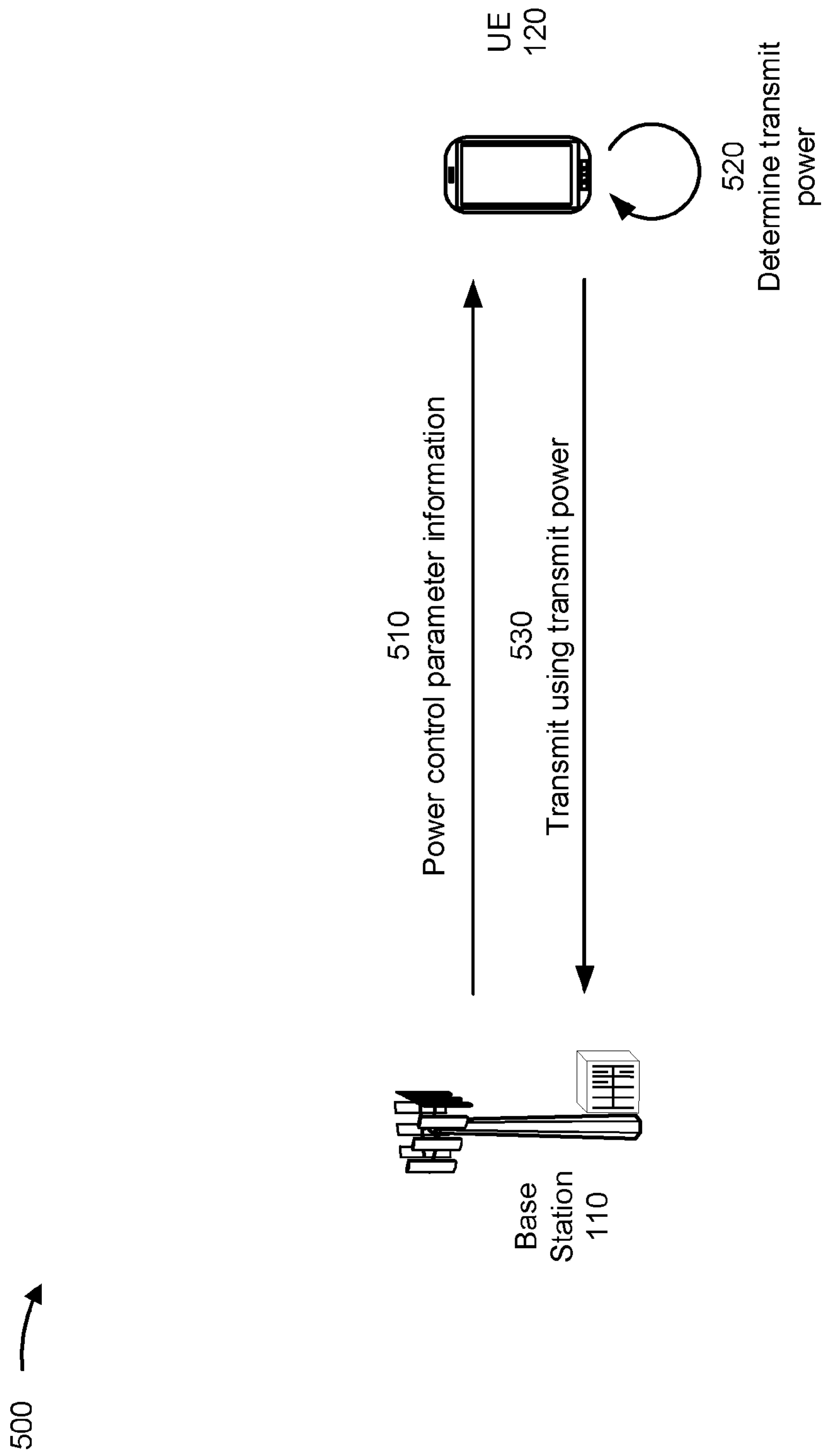
FIG. 5 is a diagram illustrating an example associated with power control parameter indication in connection with a transmission configuration indicator (TCI) state, in accordance with the present disclosure.

FIG. 5 is a diagram illustrating an example 500 associated with power control parameter indication in connection with a transmission configuration indicator state, in accordance with the present disclosure. As shown in FIG. 5, example 500 includes communication between a base station 110 and a UE 120. In some aspects, base station 110 and UE 120 may be included in a wireless network, such as wireless network 100. Base station 110 and UE 120 may communicate via a wireless access link, which may include an uplink and a downlink.

As further shown in FIG. 5, and by reference number 510, UE 120 may receive, from base station 110, power control parameter information. For example, UE 120 may receive signaling identifying a plurality of sets of power control parameters (e.g., first signaling) and signaling indicating a set of power control parameters to use for transmission (e.g., second signaling). In this case, the first signaling may indicate an association between a TCI state and the plurality of sets of power control parameters and the second signaling may indicate a service to use for transmission, from which UE 120 may derive a set of power control parameters to use for determining a transmit power. In some aspects, UE 120 may use closed loop power control and may receive information identifying a set of power control parameters that includes a P0 parameter, an alpha parameter, a closed loop index parameter, or a delta value parameter for determining a transmit power in a transmit power control procedure.

In some aspects, the plurality of sets of power control parameters are a plurality settings of power control parameters. For example, the plurality of sets of power control parameters may include a plurality of sets of values for a single set of power control parameters. In other words, a first set of power control parameters may comprise a first value for a first power control parameter and a first value for a second power control parameter and a second set of power control parameters may comprise a second value for the first power control parameter and a second value for the second power control parameter. In this case, UE 120 may be configured by the first signalling with a plurality of settings of power control parameters (e.g., a setting includes a P0 value, an alpha value, and a closed loop index) associated with a TCI for a UL channel that may be scheduled for an eMBB service or a URLLC service. For example, among the multiple settings of power control parameters associated with a TCI for a PUSCH, a first setting of power control parameters may be used when the PUSCH is scheduled by second signaling for eMBB service and a second setting may be used when the PUSCH is scheduled by the second signaling for a URLLC service.

In some examples, a common setting list of power control parameters may be configured for eMBB and URLLC. In this case, for a TCI, the first and the second associated settings of power control parameters may be used for eMBB service and URLLC service, respectively. In some examples, multiple separate setting lists of power control parameters may be configured for eMBB and URLLC. In this case, for a TCI, the associated power control parameter settings from a first setting list and a second setting list may be used for eMBB and URLLC, respectively.

In some aspects, the plurality of sets of power control parameters are one setting of power control parameters with a plurality of P0 values. For example, UE 120 may be configured, by first signalling, with one setting of power control parameters (including multiple P0 values, an alpha value, and a closed loop index) associated with a TCI for a UL channel that may be scheduled for eMBB or URLLC. In this case, among multiple P0 values associated with a TCI for a PUSCH, one P0 value may be used when the PUSCH is scheduled by second signaling for eMBB service and another P0 value may be used when the PUSCH is scheduled by the second signaling for URLLC service.

In some aspects, the plurality of sets of power control parameters are a single setting of power control parameters with a set of multiple P0 values. For example, UE 120 may be configured by the first signalling with one setting of power control parameters (including a P0 value, an alpha value, and a closed loop index) associated with a TCI for a UL channel that may be scheduled for eMBB service, and also configured with a set of P0 values (e.g., a P0 list) associated with the TCI for the UL channel that may be scheduled for URLLC service. In this case, among the multiple P0 values associated with a TCI for a PUSCH transmission, the P0 value in the setting of power control parameters may be used when the PUSCH is scheduled by the second signaling for eMBB service and the P0 values in the set of P0 values may be used when the PUSCH is scheduled by the second signaling for URLLC service.

In some aspects, the plurality of sets of power control parameters are a single setting of power control parameters with a single P0 value and a set of multiple delta values (e.g., delta P0 values (dP)). For example, UE 120 may be configured by the first signalling with one setting of power control parameters (including a P0 value, an alpha value, and a closed loop index) associated with a TCI for a UL channel that may be scheduled for eMBB service, and also configured with a set of delta values associated with the TCI for the UL channel that may be scheduled for URLLC service. In this case, the P0 value in the setting of power control parameters may be used when the PUSCH is scheduled by the second signaling for eMBB service, and the delta values in may be used to adjust the P0 value in the setting of power control parameters may be used when the PUSCH is scheduled by the second signaling for URLLC service, as described in more detail herein.

In some aspects, UE 120 may receive DCI with an open-loop power control parameter set field set to select a value from a plurality of possible power control parameters (e.g., P0 values or delta (dP) values) associated with a TCI and an uplink channel. For example, UE 120 may receive DCI selecting or indicating a setting of power control parameters for a scheduled uplink channel. In this case, the DCI may select or indicate different settings of power control parameter for a UL transmission scheduled for eMBB and for URLLC. Additionally, or alternatively, UE 120 may receive DCI selecting or indicating different P0 parameters for a scheduled uplink channel. In this case, the DCI may select or indicate different P0 values for a UL transmission scheduled for eMBB and for URLLC. Additionally, or alternatively, UE 120 may receive DCI selecting or indicating whether to apply a delta value for a scheduled uplink channel. For example, the DCI may indicate to not apply the delta value to a P0 value for a first service (e.g., to use P0 for the first service, such as eMBB) and may indicate to apply the delta value to a second value (e.g., which adjusts a P0 value to a different P0 value for the second service, such as URLLC), as described in more detail below.

In some aspects, when UE 120 is configured with more than one set of power control parameters or more than one power control parameter for one uplink channel, a field for power parameter selection (such as open-loop power control parameter set indication) is included in a DCI format of DCI received by UE 120. For example, UE 120 may receive DCI with DCI format 0_1 or DCI format 0_2. UE 120 may receive DCI with a field to select one of a plurality of power control parameters associated with a TCI for a UL channel based at least in part on whether the UL channel is for transmission of eMBB service or URLLC service. The field may select and indicate one setting of power control parameters for a scheduled UL channel. For example, the first and the second codepoints of an open-loop power control parameter set indication in DCI may indicate two different settings of power control parameters from multiple configured settings associated with a TCI when UL channels to apply the TCI are scheduled for eMBB service or URLLC service, respectively. UE 120 may receive a DCI with the field to select and indicate one P0 value for a scheduled UL channel. For example, the first and the second codepoints of an open-loop power control parameter set indication may indicate two different P0 values from multiple configured P0 values associated with a TCI when UL channels to apply the TCI are scheduled for eMBB service or URLLC service, respectively. When an association between the power control parameters and the TCI is configured via MAC-CE signaling, the DCI may indicate power control parameters that have been associated by the MAC-CE to the TCI. For example, the codepoints of the open-loop power control parameter set indication in DCI may map to power control parameters associated by MAC-CE to a TCI.

In some aspects, UE 120 may receive information indicating a plurality of sets of power control parameters corresponding to a plurality of services. For example, for a TCI state that is applicable to one or more uplink channels (e.g., a PUCCH, a PUSCH, or an SRS), UE 120 may receive information identifying a first set of power control parameters for eMBB service and a second set of power control parameters for URLLC service. Although some aspects are described herein in terms of eMBB service and URLLC service, other services are contemplated. In some aspects, power control parameters may differ for different uplink channels. For example, UE 120 may receive information indicating a first set of power control parameters for URLLC PUCCH communication, a second set of power control parameters for URLLC PUSCH communication, a third set of power control parameters for URLLC SRS communication, or a fourth set of power control parameters for eMBB PUCCH communication, among other examples. Alternatively, power control parameters may be common among different uplink channels. For example, UE 120 may receive information indicating a first set of power control parameters for URLLC PUCCH or PUSCH communication and a second set of power control parameters for eMBB PUCCH or PUSCH communication.

In some aspects, each set of power control parameters may include a plurality of power control parameters. For example, UE 120 may receive information indicating, for eMBB service, a first power control parameter set including a first P0 value, a first alpha value, and a first closed loop index, and may receive information indicating, for URLLC service, a second power control parameter set including a second P0 value, a second alpha value, and a second closed loop index. Additionally, or alternatively, sets of power control parameters may have parameters in common or may omit parameters. For example, UE 120 may receive information indicating a first P0 value for eMBB service and a second P0 value for URLLC service. In this case, UE 120 may use a common alpha value or closed loop index for both eMBB service and URLLC service (e.g., a common alpha value in both a first power control parameter set and in a second power control parameter set or a common alpha value configured separate from and to be used with the first power control parameter set and the second power control parameter set).

In some aspects, the plurality of power control parameters associated with a unified TCI may be configured only for PUSCH. In some aspects, the plurality of power control parameters associated with a unified TCI may be configured for different UL channels including PUCCH and PUSCH. In some aspects, the plurality of power control parameters associated with a unified TCI may be configured independently for uplink channels such as PUCCH and PUSCH. In some aspects, the plurality of power control parameters associated with a unified TCI may be configured common to multiple UL channels associated with a TCI.

In some aspects, UE 120 may receive information indicating a first power control parameter set and a second power control parameter set that is based at least in part on the first power control parameter set. In this case, a first power control parameter set may have a P0 value $P0_1$ and a second power control parameter set may have a P0 value $P0_{1,\ dP}$ (or represented "($P0_1$, dp)"). For example, UE 120 may receive TCI-specific P0 values and delta values, such that a first TCI, TCI-1, is associated with $P0_1$ for eMBB PUSCH and ($P0_1$, $dP_1$) for URLLC PUSCH and a second TCI, TCI-2, is associated with $P0_2$ for eMBB PUSCH and ($P0_2$, $dP_2$) for URLLC PUSCH. In another example, UE 120 may receive a TCI-specific P0 value and a TCI-common delta value, such that TCI-1 is associated with $P0_1$ for eMBB PUSCH and ($P0_1$, dP) for URLLC PUSCH and TCI-2 is associated with $P0_2$ for eMBB PUSCH and ($P0_2$, dP) for URLLC PUSCH. In another example, UE 120 may receive a channel-specific P0 value and a TCI-common delta value, such that TCI-1 is associated with $P0_A$ for eMBB PUSCH, ($P0_A$, dP) for URLLC PUSCH, $P0_B$ for eMBB PUCCH and ($P0_B$, dP) for URLLC PUCCH.

In some aspects, when multiple power control parameters or multiple sets of power control parameters are configured for UE 120 and when a TCI is not explicitly associated with any of the power control parameters, UE 120 may determine the power control parameters for UL transmissions based on a configured rule. In one example, the power control parameters may be configured and indicated for an uplink channel not associated with any TCI. In this case, UE 120 may be configured with a first RRC parameter P0-PUSCH-AlphaSet including a P0 value and an alpha value as the first set of power control parameters and a second RRC parameter P0-PUSCH-Set including a list of P0 values as the second set of power control parameters associated with an SRS resource indication value for a PUSCH. A DCI field may indicate an SRI value for determining the first and the second sets of power control parameters. Additionally, a DCI field, such as an open-loop indication parameter set indication field, may indicate which P0 value in the first and the second sets of power control parameters is applied for a PUSCH associated with the indicated SRI value. In another example, UE 120 may determine a default set of power control parameters for a TCI. In this case, when multiple sets of P0 values are configured for the UE 120, among multiple configured sets of P0 values, a set may be a default set for TCIs not explicitly associated with any power control parameters. For example, the default set may be a set with lowest set identifier (ID). A DCI field, such as an open-loop power control parameter set indication field may indicate which P0 value from the default set of P0 values is applied for the scheduled PUSCH. A DCI field with a codepoint value of "01" may indicate a first P0 value in a default P0 set is used for a TCI not explicitly associated with any power control parameters. In contrast, a DCI field with a codepoint value of "10" may indicate a second P0 value in a default P0 set is used for a TCI not explicitly associated with any power control parameters. Other arrangements of indications may be possible.

In some aspects, when multiple power control parameters or multiple sets of power control parameters are configured, a DCI field size for power control parameter selection may be configured on a per DCI format basis. For a TCI associated with a greater quantity power control parameters than there are available DCI codepoints for power control parameter selection, UE 120 may map a set of associated power parameters to DCI codepoints in a configured order. For example, when UE is configured with a set of 4 P0 values associated with the DCI and the DCI field size for power control parameter selection is one, the UE may map the first two P0 values in the set to two codepoints for power control parameter selection in DCI.

As further shown in FIG. 5, and by reference numbers 520 and 530, UE 120 may determine a transmit power and transmit, to base station 110, using the transmit power. For example, UE 120 may select a set of power control parameters based at least in part on a service with which UE 120 is to transmit and may determine the transmit power using the selected set of power control parameters. Additionally, or alternatively, UE 120 may select the set of power control parameters based at least in part on a TCI state or a channel type, and the UE 120 may determine the transmit power using the selected set of power control parameters.

As indicated above, FIG. 5 is provided as an example. Other examples may differ from what is described with respect to FIG. 5.

Figure 6:
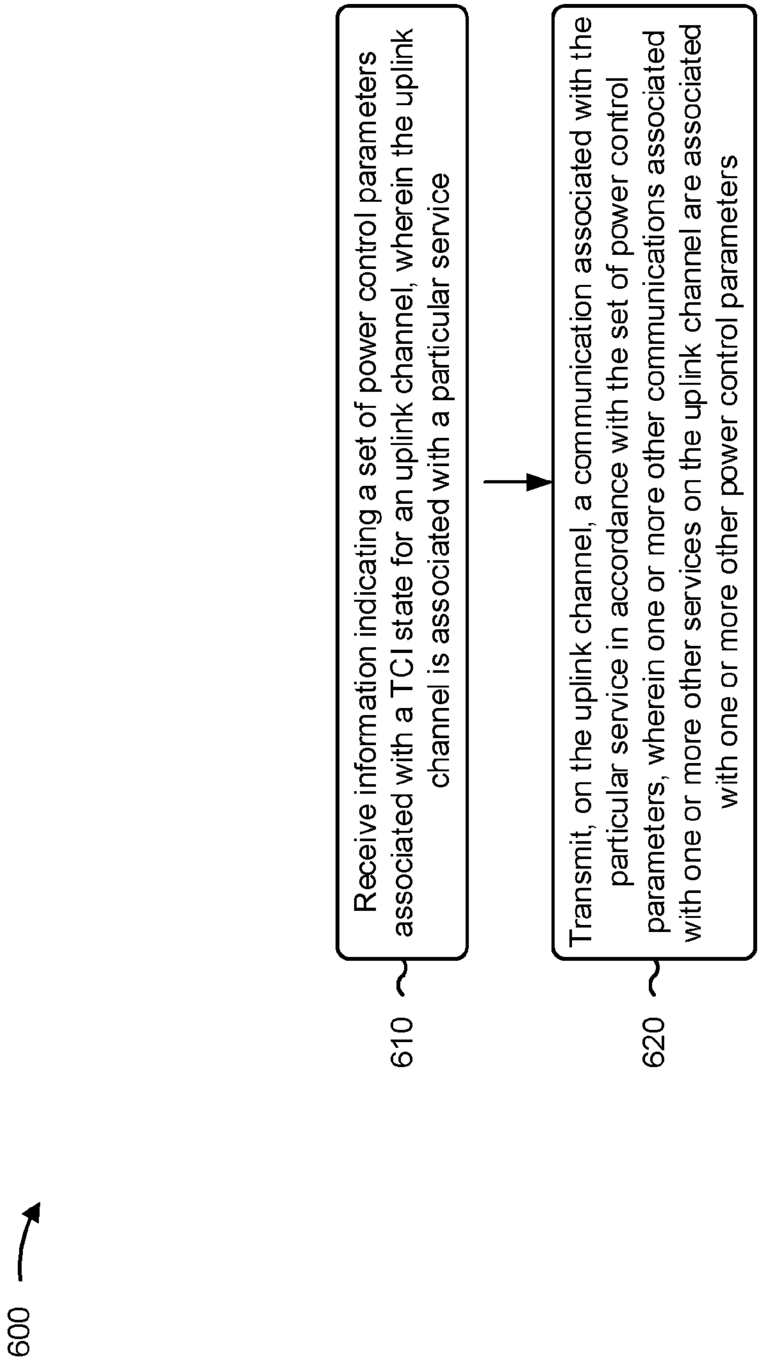
FIGS. 6-7 are diagrams illustrating example processes associated with power control parameter indication in connection with a TCI state, in accordance with the present disclosure.

FIG. 6 is a diagram illustrating an example process 600 performed, for example, by a UE, in accordance with the present disclosure. Example process 600 is an example where the UE (e.g., UE 120) performs operations associated with power control parameter indication in connection with a TCI state.

As shown in FIG. 6, in some aspects, process 600 may include receiving information indicating a set of power control parameters associated with a TCI state for an uplink channel, wherein the uplink channel is associated with a particular service (block 610). For example, the UE (e.g., using communication manager 140 and/or reception component 802, depicted in FIG. 8) may receive information indicating a set of power control parameters associated with a TCI state for an uplink channel, wherein the uplink channel is associated with a particular service, as described above.

As further shown in FIG. 6, in some aspects, process 600 may include transmitting, on the uplink channel, a communication associated with the particular service in accordance with the set of power control parameters, wherein one or more other communications associated with one or more other services on the uplink channel are associated with one or more other power control parameters (block 620). For example, the UE (e.g., using communication manager 140 and/or transmission component 804, depicted in FIG. 8) may transmit, on the uplink channel, a communication associated with the particular service in accordance with the set of power control parameters, wherein one or more other communications associated with one or more other services on the uplink channel are associated with one or more other power control parameters, as described above.

Process 600 may include additional aspects, such as any single aspect or any combination of aspects described below and/or in connection with one or more other processes described elsewhere herein.

In a first aspect, the particular service is an eMBB service or a URLLC service.

In a second aspect, alone or in combination with the first aspect, the set of power control parameters includes at least one of a P0 parameter, an alpha parameter, a delta parameter, or a closed loop index parameter.

In a third aspect, alone or in combination with one or more of the first and second aspects, the uplink channel is at least one of a physical uplink control channel, a SRS channel, or a physical uplink shared channel.

In a fourth aspect, alone or in combination with one or more of the first through third aspects, the TCI state is associated with a plurality of subsets of power control parameters for a plurality of types of the uplink channel.

In a fifth aspect, alone or in combination with one or more of the first through fourth aspects, the TCI state is associated with a single set of power control parameters common to a plurality of types of the uplink channel.

In a sixth aspect, alone or in combination with one or more of the first through fifth aspects, the TCI state is associated with a plurality of subsets of power control parameters for a plurality of types of services for the particular service.

In a seventh aspect, alone or in combination with one or more of the first through sixth aspects, the TCI state is associated with one or more first power control parameters, of the set of power control parameters, common to a plurality of types of services for the particular service and a plurality of sets of one or more second power control parameters, of the set of power control parameters, corresponding to the plurality of types of services.

In an eighth aspect, alone or in combination with one or more of the first through seventh aspects, at least one of the set of power control parameters is TCI-specific for each available type of the uplink channel.

In a ninth aspect, alone or in combination with one or more of the first through eighth aspects, at least one of the set of power control parameters is TCI-common across available types of the uplink channel.

In a tenth aspect, alone or in combination with one or more of the first through ninth aspects, process 600 includes receiving downlink control information associated with selecting or indicating one or more power control parameters of the set of power control parameters.

In an eleventh aspect, alone or in combination with one or more of the first through tenth aspects, the downlink control information selects or indicates the set of power control parameters for the particular service of a plurality of sets of power control parameters for a plurality of services.

In a twelfth aspect, alone or in combination with one or more of the first through eleventh aspects, the downlink control information selects or indicates a subset of power control parameters, of the set of power control parameters, for the particular service of a plurality of sets of power control parameters for a plurality of services.

In a thirteenth aspect, alone or in combination with one or more of the first through twelfth aspects, the downlink control information selects or indicates a subset of power control parameters, of the set of power control parameters, to be applied for the uplink channel.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
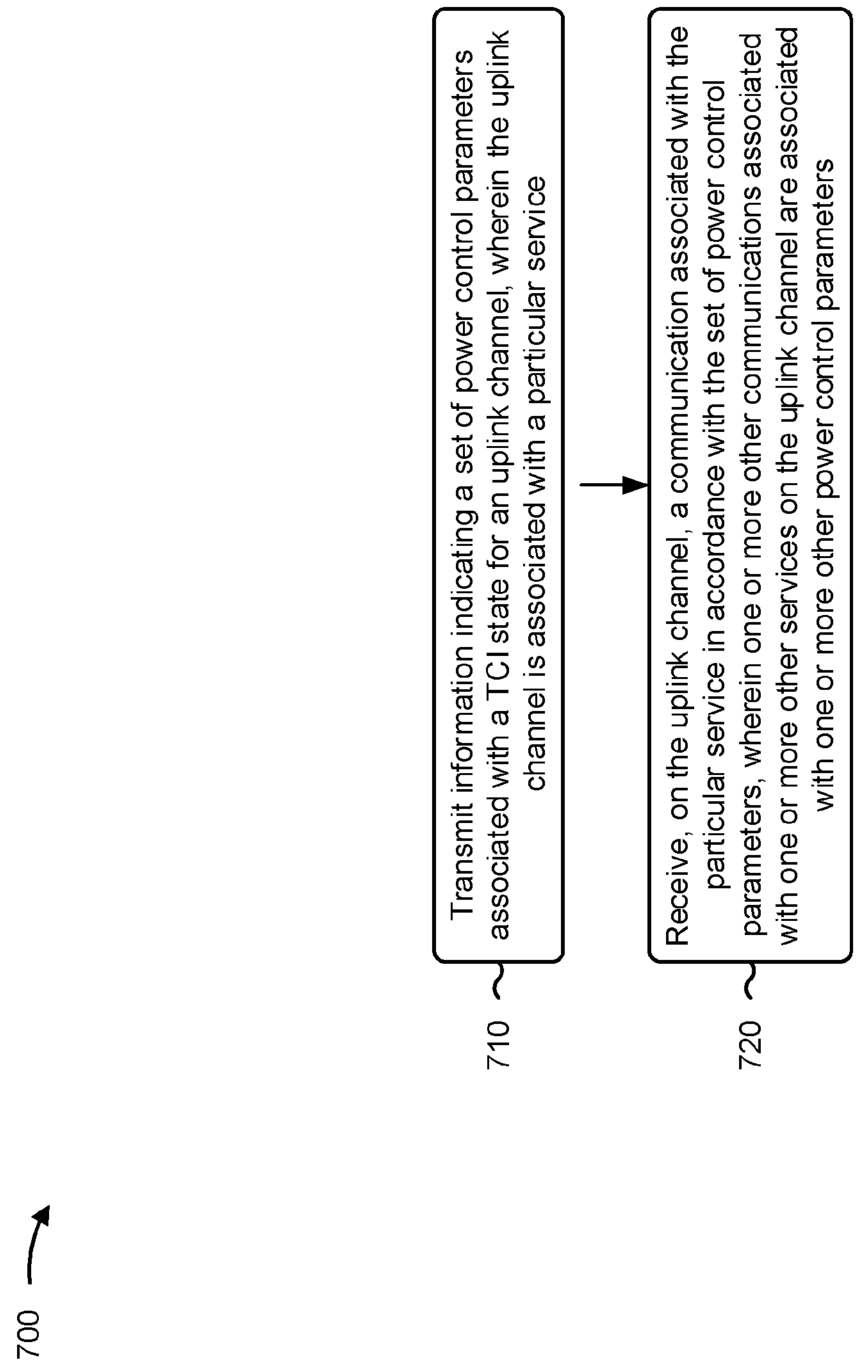

FIG. 7 is a diagram illustrating an example process 700 performed, for example, by a base station, in accordance with the present disclosure. Example process 700 is an example where the base station (e.g., base station 110) performs operations associated with power control parameter indication in connection with a TCI state.

As shown in FIG. 7, in some aspects, process 700 may include transmitting information indicating a set of power control parameters associated with a TCI state for an uplink channel, wherein the uplink channel is associated with a particular service (block 710). For example, the base station (e.g., using communication manager 150 and/or transmission component 904, depicted in FIG. 9) may transmit information indicating a set of power control parameters associated with a TCI state for an uplink channel, wherein the uplink channel is associated with a particular service, as described above.

As further shown in FIG. 7, in some aspects, process 700 may include receiving, on the uplink channel, a communication associated with the particular service in accordance with the set of power control parameters, wherein one or more other communications associated with one or more other services on the uplink channel are associated with one or more other power control parameters (block 720). For example, the base station (e.g., using communication manager 150 and/or reception component 902, depicted in FIG. 9) may receive, on the uplink channel, a communication associated with the particular service in accordance with the set of power control parameters, wherein one or more other communications associated with one or more other services on the uplink channel are associated with one or more other power control parameters, as described above.

Process 700 may include additional aspects, such as any single aspect or any combination of aspects described below and/or in connection with one or more other processes described elsewhere herein.

In a first aspect, the particular service is an eMBB service or a URLLC service.

In a second aspect, alone or in combination with the first aspect, the set of power control parameters includes at least one of a P0 parameter, an alpha parameter, a delta parameter, or a closed loop index parameter.

In a third aspect, alone or in combination with one or more of the first and second aspects, the uplink channel is at least one of a physical uplink control channel, a SRS channel, or a physical uplink shared channel.

In a fourth aspect, alone or in combination with one or more of the first through third aspects, the TCI state is associated with a plurality of subsets of power control parameters for a plurality of types of the uplink channel.

In a fifth aspect, alone or in combination with one or more of the first through fourth aspects, the TCI state is associated with a single set of power control parameters common to a plurality of types of the uplink channel.

In a sixth aspect, alone or in combination with one or more of the first through fifth aspects, the TCI state is associated with a plurality of subsets of power control parameters for a plurality of types of services for the particular service.

In a seventh aspect, alone or in combination with one or more of the first through sixth aspects, the TCI state is associated with one or more first power control parameters, of the set of power control parameters, common to a plurality of types of services for the particular service and a plurality of sets of one or more second power control parameters, of the set of power control parameters, corresponding to the plurality of types of services.

In an eighth aspect, alone or in combination with one or more of the first through seventh aspects, at least one of the set of power control parameters is TCI-specific for each available type of the uplink channel.

In a ninth aspect, alone or in combination with one or more of the first through eighth aspects, at least one of the set of power control parameters is TCI-common across available types of the uplink channel.

In a tenth aspect, alone or in combination with one or more of the first through ninth aspects, process 700 includes transmitting downlink control information associated with selecting or indicating one or more power control parameters of the set of power control parameters.

In an eleventh aspect, alone or in combination with one or more of the first through tenth aspects, the downlink control information selects or indicates the set of power control parameters for the particular service of a plurality of sets of power control parameters for a plurality of services.

In a twelfth aspect, alone or in combination with one or more of the first through eleventh aspects, the downlink control information selects or indicates a subset of power control parameters, of the set of power control parameters, for the particular service of a plurality of sets of power control parameters for a plurality of services.

In a thirteenth aspect, alone or in combination with one or more of the first through twelfth aspects, the downlink control information selects or indicates a subset of power control parameters, of the set of power control parameters, to be applied for the uplink channel.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
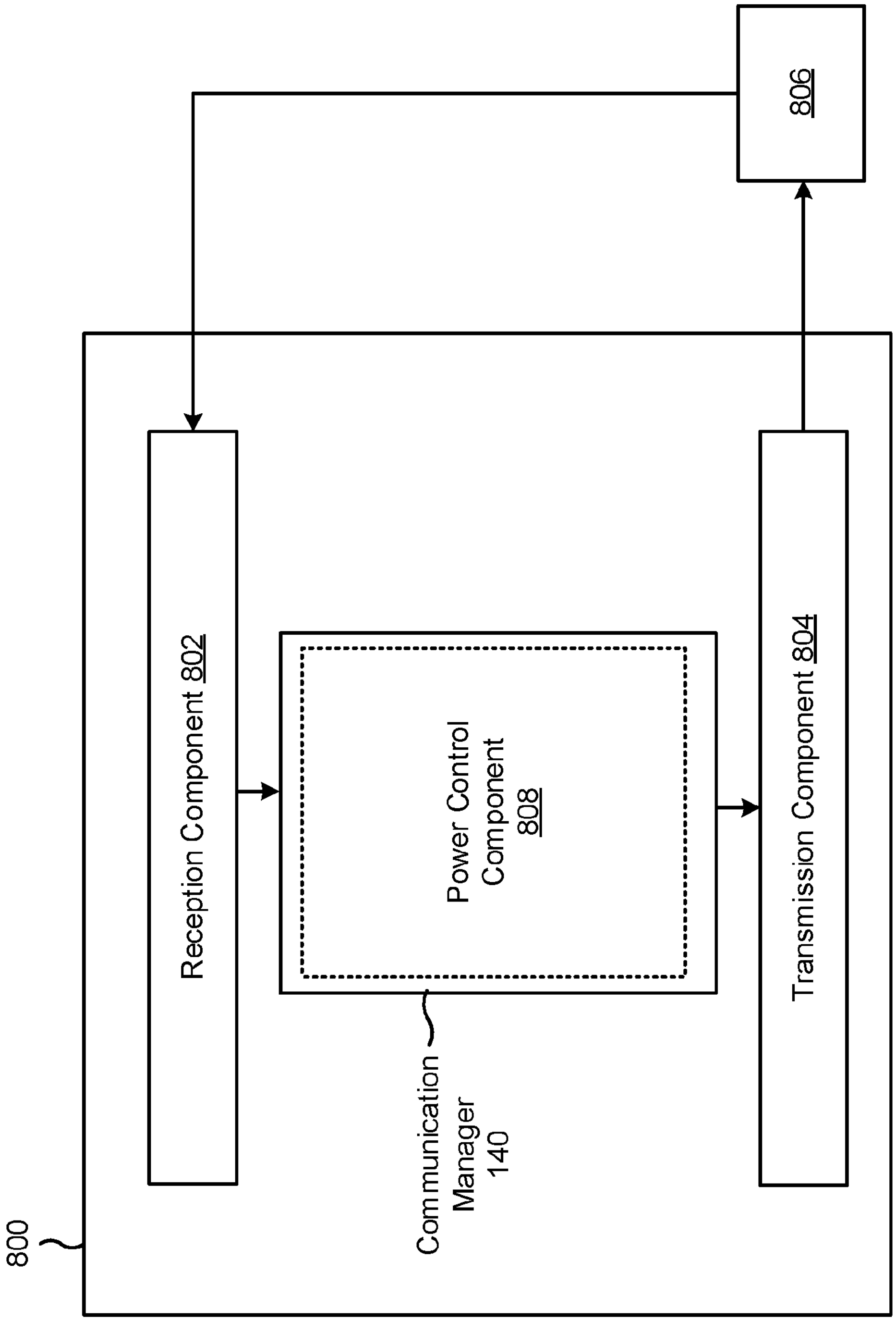
FIGS. 8-9 are diagrams of example apparatuses for wireless communication, in accordance with the present disclosure.

FIG. 8 is a diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include a power control component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The reception component 802 may receive information indicating a set of power control parameters associated with a TCI state for an uplink channel, wherein the uplink channel is associated with a particular service. The transmission component 804 may transmit, on the uplink channel, a communication associated with the particular service in accordance with the set of power control parameters, wherein one or more other communications associated with one or more other services on the uplink channel are associated with one or more other power control parameters.

The reception component 802 may receive downlink control information associated with selecting or indicating one or more power control parameters of the set of power control parameters. The power control component 808 may determine a transmit power for a transmission using a set of power control parameters selected based at least in part on a service for the transmission.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
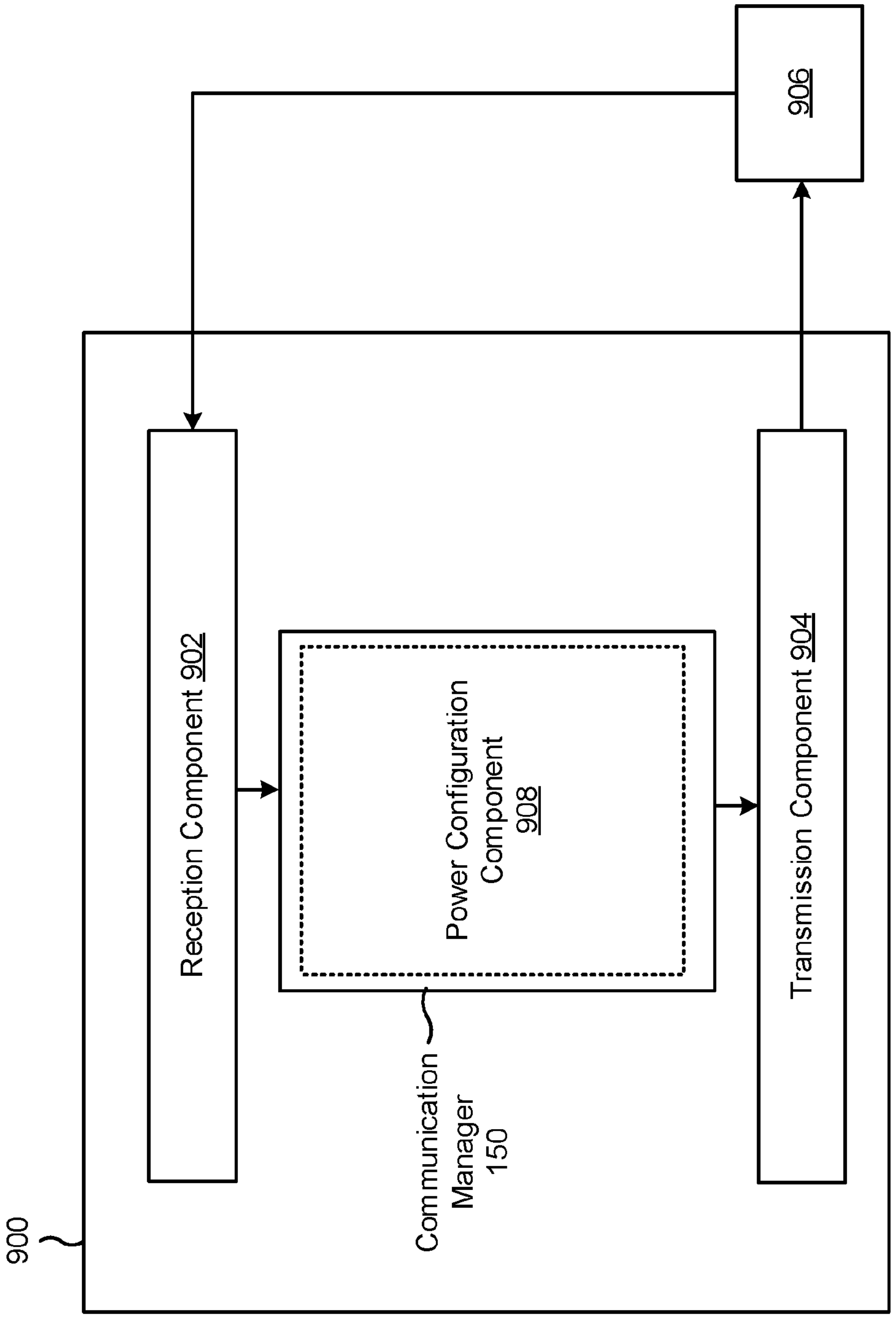

FIG. 9 is a diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include a power configuration component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the base station described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the base station described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the base station described in connection with FIG. 2. In some aspects, the transmission component 904 may be co-located with the reception component 902 in a transceiver.

The transmission component 904 may transmit information indicating a set of power control parameters associated with a TCI state for an uplink channel, wherein the uplink channel is associated with a particular service. The reception component 902 may receive, on the uplink channel, a communication associated with the particular service in accordance with the set of power control parameters, wherein one or more other communications associated with one or more other services on the uplink channel are associated with one or more other power control parameters.

The transmission component 904 may transmit downlink control information associated with selecting or indicating one or more power control parameters of the set of power control parameters. The power configuration component 908 may configure sets of power control parameters for the apparatus 906 to use for different services.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving information indicating a set of power control parameters associated with a transmission configuration indicator (TCI) state for an uplink channel, wherein the uplink channel is associated with a particular service: and transmitting, on the uplink channel, a communication associated with the particular service in accordance with the set of power control parameters, wherein one or more other communications associated with one or more other services on the uplink channel are associated with one or more other power control parameters.

Aspect 2: The method of Aspect 1, wherein the particular service is an enhanced mobile broadband (eMBB) service or an ultra-reliable low-latency communication (URLLC) service.

Aspect 3: The method of any of Aspects 1 to 2, wherein the set of power control parameters includes at least one of: a P0 parameter, an alpha parameter, a delta parameter, or a closed loop index parameter.

Aspect 4: The method of any of Aspects 1 to 3, wherein the uplink channel is at least one of: a physical uplink control channel, a sounding reference signal (SRS) channel, or a physical uplink shared channel.

Aspect 5: The method of any of Aspects 1 to 4, wherein the TCI state is associated with a plurality of subsets of power control parameters for a plurality of types of the uplink channel.

Aspect 6: The method of any of Aspects 1 to 4, wherein the TCI state is associated with a single set of power control parameters common to a plurality of types of the uplink channel.

Aspect 7: The method of any of Aspects 1 to 6, wherein the TCI state is associated with a plurality of subsets of power control parameters for a plurality of types of services for the particular service.

Aspect 8: The method of any of Aspects 1 to 7, wherein the TCI state is associated with one or more first power control parameters, of the set of power control parameters, common to a plurality of types of services for the particular service and a plurality of sets of one or more second power control parameters, of the set of power control parameters, corresponding to the plurality of types of services.

Aspect 9: The method of any of Aspects 1 to 8, wherein at least one of the set of power control parameters is TCI-specific for each available type of the uplink channel.

Aspect 10: The method of any of Aspects 1 to 9, wherein at least one of the set of power control parameters is TCI-common across available types of the uplink channel.

Aspect 11: The method of any of Aspects 1 to 10, further comprising: receiving downlink control information associated with selecting or indicating one or more power control parameters of the set of power control parameters.

Aspect 12: The method of Aspect 11, wherein the downlink control information selects or indicates the set of power control parameters for the particular service of a plurality of sets of power control parameters for a plurality of services.

Aspect 13: The method of any of Aspects 11 to 12, wherein the downlink control information selects or indicates a subset of power control parameters, of the set of power control parameters, for the particular service of a plurality of sets of power control parameters for a plurality of services.

Aspect 14: The method of any of Aspects 11 to 12, wherein the downlink control information selects or indicates a subset of power control parameters, of the set of power control parameters, to be applied for the uplink channel.

Aspect 15: A method of wireless communication performed by a base station, comprising: transmitting information indicating a set of power control parameters associated with a transmission configuration indicator (TCI) state for an uplink channel, wherein the uplink channel is associated with a particular service: and receiving, on the uplink channel, a communication associated with the particular service in accordance with the set of power control parameters, wherein one or more other communications associated with one or more other services on the uplink channel are associated with one or more other power control parameters.

Aspect 16: The method of Aspect 15, wherein the particular service is an enhanced mobile broadband (eMBB) service or an ultra-reliable low-latency communication (URLLC) service.

Aspect 17: The method of any of Aspects 15 to 16, wherein the set of power control parameters includes at least one of: a P0 parameter, an alpha parameter, a delta parameter, or a closed loop index parameter.

Aspect 18: The method of any of Aspects 15 to 17, wherein the uplink channel is at least one of: a physical uplink control channel, a sounding reference signal (SRS) channel, or a physical uplink shared channel.

Aspect 19: The method of any of Aspects 15 to 18, wherein the TCI state is associated with a plurality of subsets of power control parameters for a plurality of types of the uplink channel.

Aspect 20: The method of any of Aspects 15 to 18, wherein the TCI state is associated with a single set of power control parameters common to a plurality of types of the uplink channel.

Aspect 21: The method of any of Aspects 15 to 20, wherein the TCI state is associated with a plurality of subsets of power control parameters for a plurality of types of services for the particular service.

Aspect 22: The method of any of Aspects 15 to 21, wherein the TCI state is associated with one or more first power control parameters, of the set of power control parameters, common to a plurality of types of services for the particular service and a plurality of sets of one or more second power control parameters, of the set of power control parameters, corresponding to the plurality of types of services.

Aspect 23: The method of any of Aspects 15 to 22, wherein at least one of the set of power control parameters is TCI-specific for each available type of the uplink channel.

Aspect 24: The method of any of Aspects 15 to 23, wherein at least one of the set of power control parameters is TCI-common across available types of the uplink channel.

Aspect 25: The method of any of Aspects 15 to 24, further comprising: transmitting downlink control information associated with selecting or indicating one or more power control parameters of the set of power control parameters.

Aspect 26: The method of Aspect 25, wherein the downlink control information selects or indicates the set of power control parameters for the particular service of a plurality of sets of power control parameters for a plurality of services.

Aspect 27: The method of any of Aspects 25 to 26, wherein the downlink control information selects or indicates a subset of power control parameters, of the set of power control parameters, for the particular service of a plurality of sets of power control parameters for a plurality of services.

Aspect 28: The method of any of Aspects 25 to 26, wherein the downlink control information selects or indicates a subset of power control parameters, of the set of power control parameters, to be applied for the uplink channel.

Aspect 29: An apparatus for wireless communication at a device, comprising a processor: memory coupled with the processor: and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor: memory coupled with the processor: and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

a memory; and one or more processors, coupled to the memory, configured to:

receive information indicating a set of power control parameters associated with a transmission configuration indicator (TCI) state for an uplink channel, wherein the uplink channel is associated with a particular service; and transmit, on the uplink channel, a communication associated with the particular service in accordance with the set of power control parameters, wherein one or more other communications associated with one or more other services on the uplink channel are associated with one or more other power control parameters.

2. The UE of claim 1, wherein the particular service is an enhanced mobile broadband (eMBB) service or an ultra-reliable low-latency communication (URLLC) service.

3. The UE of claim 1, wherein the set of power control parameters includes at least one of:

a P0 parameter,
an alpha parameter,
a delta parameter, or
a closed loop index parameter.

4. The UE of claim 1, wherein the uplink channel is at least one of:

a physical uplink control channel,
a sounding reference signal (SRS) channel, or
a physical uplink shared channel.

5. The UE of claim 1, wherein the TCI state is associated with a plurality of subsets of power control parameters for a plurality of types of the uplink channel.

6. The UE of claim 1, wherein the TCI state is associated with a single set of power control parameters common to a plurality of types of the uplink channel.

7. The UE of claim 1, wherein the TCI state is associated with a plurality of subsets of power control parameters for a plurality of types of services for the particular service.

8. The UE of claim 1, wherein the TCI state is associated with one or more first power control parameters, of the set of power control parameters, common to a plurality of types of services for the particular service and a plurality of sets of one or more second power control parameters, of the set of power control parameters, corresponding to the plurality of types of services.

9. The UE of claim 1, wherein at least one of the set of power control parameters is TCI-specific for each available type of the uplink channel.

10. The UE of claim 1, wherein at least one of the set of power control parameters is TCI-common across available types of the uplink channel.

11. The UE of claim 1, wherein the one or more processors are further configured to:

receive downlink control information associated with selecting or indicating one or more power control parameters of the set of power control parameters.

12. The UE of claim 11, wherein the downlink control information selects or indicates the set of power control parameters for the particular service from a plurality of sets of power control parameters for a plurality of services.

13. The UE of claim 11, wherein the downlink control information selects or indicates a subset of power control parameters, of the set of power control parameters, for the particular service from a plurality of sets of power control parameters for a plurality of services.

14. The UE of claim 11, wherein the downlink control information selects or indicates a subset of power control parameters, of the set of power control parameters, to be applied for the uplink channel.

15. A base station for wireless communication, comprising:

a memory; and
one or more processors, coupled to the memory, configured to:
transmit information indicating a set of power control parameters associated with a transmission configuration indicator (TCI) state for an uplink channel, wherein the uplink channel is associated with a particular service; and
receive, on the uplink channel, a communication associated with the particular service in accordance with the set of power control parameters, wherein one or more other communications associated with one or more other services on the uplink channel are associated with one or more other power control parameters.

16. The base station of claim 15, wherein the particular service is an enhanced mobile broadband (eMBB) service or an ultra-reliable low-latency communication (URLLC) service.

17. The base station of claim 15, wherein the set of power control parameters includes at least one of:

a P0 parameter,
an alpha parameter,
a delta parameter, or
a closed loop index parameter.

18. The base station of claim 15, wherein the uplink channel is at least one of:

a physical uplink control channel,
a sounding reference signal (SRS) channel, or
a physical uplink shared channel.

19. The base station of claim 15, wherein the TCI state is associated with a plurality of subsets of power control parameters for a plurality of types of the uplink channel.

20. A method of wireless communication performed by a user equipment (UE), comprising:

receiving information indicating a set of power control parameters associated with a transmission configuration indicator (TCI) state for an uplink channel, wherein the uplink channel is associated with a particular service; and
transmitting, on the uplink channel, a communication associated with the particular service in accordance with the set of power control parameters, wherein one or more other communications associated with one or more other services on the uplink channel are associated with one or more other power control parameters.

* * * * *